(12) United States Patent
Wang

(10) Patent No.: US 7,848,831 B2
(45) Date of Patent: Dec. 7, 2010

(54) REAL-TIME OPERATING OPTIMIZED METHOD OF MULTI-INPUT AND MULTI-OUTPUT CONTINUOUS MANUFACTURING PROCEDURE

(76) Inventor: Jian Wang, Site 20C Building 1, No. 2 ShangDi Information Road, HiaDian District, Beijing 100085 (CN)

(*) Notice: Subject to any disclaimer, the term of this patent is extended or adjusted under 35 U.S.C. 154(b) by 416 days.

(21) Appl. No.: 11/988,889

(22) PCT Filed: Dec. 27, 2005

(86) PCT No.: PCT/CN2005/002324

§ 371 (c)(1),
(2), (4) Date: Jan. 16, 2008

(87) PCT Pub. No.: WO2007/009322

PCT Pub. Date: Jan. 25, 2007

(65) Prior Publication Data

US 2009/0037003 A1   Feb. 5, 2009

(30) Foreign Application Priority Data

Jul. 20, 2005  (CN) .................. 2005 1 0085063

(51) Int. Cl.
  *G05B 13/02* (2006.01)
  *G06F 7/60* (2006.01)
  *G06F 17/10* (2006.01)
  *G06F 15/18* (2006.01)
  *G06E 1/00* (2006.01)
  *G06E 3/00* (2006.01)
  *G06G 7/00* (2006.01)

(52) U.S. Cl. .................. 700/53; 700/28; 700/30; 700/31; 700/46; 703/2; 706/19

(58) Field of Classification Search ............. 700/28–31, 700/33–34, 46, 53; 703/2; 706/19
See application file for complete search history.

(56) References Cited

U.S. PATENT DOCUMENTS

| | | | |
|---|---|---|---|
| 6,701,223 B1* | 3/2004 | Rachford et al. | 700/301 |
| 2004/0215429 A1* | 10/2004 | Prabhu et al. | 703/2 |
| 2004/0249483 A1* | 12/2004 | Wojsznis et al. | 700/52 |
| 2005/0187643 A1* | 8/2005 | Sayyar-Rodsari et al. | 700/29 |
| 2006/0058899 A1* | 3/2006 | Boyden et al. | 700/44 |
| 2007/0168057 A1* | 7/2007 | Blevins et al. | 700/53 |

FOREIGN PATENT DOCUMENTS

| | | |
|---|---|---|
| CN | 1399176 | 2/2003 |
| CN | 1414070 | 4/2003 |
| JP | 7-135474 | 5/1995 |
| JP | 2001-129044 | 5/2001 |

* cited by examiner

*Primary Examiner*—Ramesh B Patel
(74) *Attorney, Agent, or Firm*—McDermott Will & Emery LLP

(57) ABSTRACT

A real-time operating optimized method of multi-input and multi-output continuous manufacture procedure includes steps as follows: first, using plurality of pivotal operation conditions in the manufacture procedure as optimized variables, and using the technical target associating with the pivotal operation conditions as the objective function, then, calculating on line the grades vector between pivotal operation conditions and the technical target at current time according to historical data of pivotal operation conditions and the technical target, using correlation integral method or other methods, at last, using this grades vector to define the adjustment direction of the operation conditions. When the grades vector is positive or negative, the pivotal operation conditions should be adjusted in order to change the grades vector to zero.

9 Claims, 5 Drawing Sheets

REAL-TIME OPERATING OPTIMIZED METHOD OF MULTI-INPUT AND MULTI-OUTPUT CONTINUOUS MANUFACTURING PROCEDURE

RELATED APPLICATIONS

This application is the U.S. National Phase under 35 U.S.C. §371 of International Application No. PCT/CN2005/002324, filed on Dec. 27, 2005, which in turn claims the benefit of Chinese Application No. 200510085063.2, filed on Jul. 20, 2005, the disclosures of which Applications are incorporated by reference herein.

TECHNICAL FIELD

This invention relates to the control technique, and specifically, relates to a Real-Time Optimization (RTO) method of Multiple-Input and Multiple-Output (MIMO) continuous production process.

BACKGROUND OF THE INVENTION

A continuous production process with continuous feeds and output products could be illustrated as FIG. 1. In FIG. 1, A is the upstream unit group of process, and the products of A are the raw material of the process unit B, while the products of B are the raw material of downstream processing unit group C. Because the number of the kinds of products of B may be more than one and these products may be feed to a plurality of downstream production units, these downstream production units are referred to as downstream unit group C. It must be pointed out that these material flows are continuous in cascade. In the unit B, there may be some key manipulating variables U, which are related to the technical objectives J such as the energy consumption, the economic benefits, the yields of the products and so on, the variables U can be referred to the input of the production unit(s), and J could be regarded as the output of the production process of B. The task of real time optimization is to maximize the objective (one or more targets combined, such as the economic benefit and the energy consumption) in a prescribed period of time by manipulating the key variables, as show in FIG. 2. It must be noticed that the objective may be switched according to the requirement of the production procedure.

To describe optimization with single objective function, the following equation can be generally used:

$$J^* = J(U^*) = {}_U^{max} J(U) \tag{1-1}$$

In the equation, J denotes the objective function, and J* denotes the optimum of the objective function J; while U is the operational variable, or is referred to as the optimized variable. U* is the optimum of the turning variable.

Generally, the functional relationship J (U) between U and J is an unknown analytically. For getting U*, two methods are commonly used: Mathematical Modeling and Online Search Methods.

1. Mathematical Modeling Method

The principle of the modeling method is to build a mathematical model of the objective function J and the optimized variable U firstly, and then to evaluate U* with nonlinear or linear programming based on the mathematical model and the constraints.

According to the different model building principles, mathematical modeling could be classified into mechanism modeling and experience modeling.

Mechanism modeling combines the operation mechanism equations of all parts of the equipment in the system according to the flow structures on the basis of the mass and energy balance principles, which forms a set of mathematical equations adaptable for the real production procedures. Finally, the relationship among the objective function and the optimized variable U is decided according to the systematical input and output, the price, and so on.

Whereas, if the described procedure is too complex, if the mechanism itself is not clear, or if the basic equation is not accuracy enough, it is often difficult to build the mechanism model. Moreover, the mechanism model of a system is generally not universal; it is even necessary to modify or change completely the model when the product and/or the feed are changed or when the process is slightly modified.

Experience modeling is to fabricate the experiential relationship between the optimized variable and the objective function based on plenty of data of the experiments and the daily operational report. The advantages of this kind of modeling are simple and universal. No matter how complex and different the procedure or the system is, the same simple method could be used to build the model, and no special process knowledge and pretest equations are needed.

However, the reliability of this method is not very good. If the operational range departs or oversteps the data sampling range when the model is built during online application, the error of model may be too much to be applied normally. Slight change of the process equipment may cause huge change of the model structure, which results in failure of the modelling works.

2. Online Search Method

Search method is a kind of universal method, the basic principle of the method is to change the value of the optimized variables on line, to observe the changing of the objective function, and then to decide whether the changing direction of the optimized variables is right. In principle, many nonlinear programming methods, such as the golden section method, could be used on line. However, this method is often very sensitive to the disturbance. It is well known that the objective function is not only the function of the optimized variables, but also the function of other uncontrollable variables (environmental variables). Thus, when the objective function is changed, it is difficult for the skilled in the art to judge whether it is caused by changes of the optimized variables or by the disturbance. In the present online search methods, the relationship between the optimized variables and the objective function is generally taken as the sole causation. Therefore, when there is the environmental disturbance, wrong judgment may be made, which could even cause reverse actions.

It is needed to point out, both of modeling and the direct search method are generally built on the basis of the mathematical descriptions of 1-1. The relationship between the objective function J and U is defined as the algebra map, without the environmental disturbance items. As a result, calculation methods educed therefore is only adaptable to the static and non-disturbance systems in principle.

In fact, situations are much more complicated. Firstly, there are not only the cause and effect relationship between the turning variables and the objective function logically, but also the dynamic procedures by time. That is, when the turning variables change, the objective function doesn't change immediately, but has a transition procedure. Secondly, from the view of real conditions of lots of industrial procedures, the objective functions often fluctuate. It is difficult to find a static condition. This is generally caused by those immeasurable and uncontrollable severe disturbances. For example, in the production procedure, the changes of component of feed often are uncontrollable. Due to the difficulties of online component measurement, these variables usually are immeasurable. On the other hand, a lot of procedures are sensitive to the changes of component. As a result, the influence of changes of component on the objective function is often larger, which could be several decade times some time, than that of the controllable factors, such as temperatures, pressures, and so on. Therefore, the fluctuation caused by the variation of the turning variables often is "submerged" in the disturbance of the component on the objective function. In this dynamic disturbance situation, any research task on realizing the turning operation has both practical and academic meanings.

SUMMARY OF THE INVENTION

The object of this invention is to provide a Real-Time Optimization method of MIMO continuous production process to solve the problems such as the complex mechanism, the strong disturbance, many optimized variables, the narrow usable range and the poor effect existed in the traditional RTO technique. This method simplifies the RTO of production process, and has strong adaptive properties and the anti-disturbances capability.

In this invention, the technique to solve the problems is a special multi-input multi-output continuous real-time optimization method. In the method, the controllable optimized variables in the production process are supposed as the optimized variables, and one or more process parameters related to the optimized variables are considered as the objective functions. Based on the dynamic historical data of the optimized variables and the objective functions, the gradient vectors of the optimized variables and the objective functions are calculated on-line, and then the moving directions of the optimized variables are determined according to the gradient vectors, if the gradient vector is positive or negative, the optimized variables should be turned to the directions to make their gradient approach to zero and maximize the objective functions. These gradients are calculated continuously online, regardless of whether the objective functions have been optimized or not. If zero gradients are not reached, the system will adjust the optimized variables to the direction to make gradients approach to zero to trace the optimum. Because the optimum of the objective function may be changed over time, the optimization procedure has to be done continually.

The method to online calculate the gradient vectors of the optimized variables with the dynamic historical data could be the Dynamic Correlation Integration (DCI) technique in this invention or other algorithms, such as dynamic model identification.

The RTO with the DCI technique is based on the dynamic correlation integration theory, which is related to a random process. In the DCI theory, the objective function, disturbance, optimized variable are considered as the random process, and the optimized variables are average controllable. In generally, the objective function $\tilde{J}(t)$ which should be calculable or measurable online is determined firstly, thus the objective function can be expressed as:

$$\tilde{J}(t) = f(\tilde{u}(t), \tilde{p}(t), t)$$

Wherein, $\tilde{u}(t)$ is an m dimension vector of average controllable variables.

$$\tilde{u}(t) = \begin{bmatrix} \tilde{u}_1(t) \\ \tilde{u}_2(t) \\ \vdots \\ \tilde{u}_m(t) \end{bmatrix}$$

Wherein, $\tilde{p}(t)$ is the disturbance, f means the unknown mapping, the objective function to be optimized is defined as:

$$\tilde{J}*(t) = \max_{E\{\tilde{u}(t)\}} E\{f[E\{\tilde{u}(t)\}, \tilde{p}(t), t]\}$$

Wherein, $E\{\tilde{u}(t)\}$ means the average value of the optimized variable, which can be the set point of the primary controller or the valve position etc. To this multivariable optimization problem, it can be proved that the gradient $$\frac{dEf}{dE\{\tilde{u}(t)\}}$$

of the mean of the objective function to the mean of the optimized variable satisfies the following equation:

$$k_{uJ} = k_{uu} \frac{dEf}{dE\{\tilde{u}(t)\}} + \varepsilon(t)$$

Wherein, $\varepsilon(t)$ is the zero mean noise, and then the vector of the DCI of the optimized variable to the objective function is defined as:

$$k_{uJ} = \begin{bmatrix} k_{u1J} \\ k_{u2J} \\ \vdots \\ k_{umJ} \end{bmatrix},$$

$$k_{uiJ} = \int_{-M}^{M} \frac{1}{2T} \int_{-T}^{T} u_i(t-\tau) J(t) \, dt \, d\tau,$$

$$i = 1, 2, \ldots, m$$

$k_{uu}$ is a self DCI matrix of optimized variables, which is defined as $$k_{uu} = \begin{bmatrix} k_{u1u1} & k_{u1u2} & \cdots & k_{u1um} \\ k_{u2u1} & k_{u2u2} & \cdots & k_{u2um} \\ \vdots & \vdots & \vdots & \vdots \\ k_{umu1} & k_{umu2} & \cdots & k_{umum} \end{bmatrix},$$

$$k_{uiuj} = \int_{-M}^{M} \frac{1}{2T} \int_{-T}^{T} u_i(t-\tau) u_j(t) \, dt \, d\tau,$$

$$i, j = 1, 2, \ldots, m$$

According to the equation:

$$k_{uu} = \begin{bmatrix} k_{u1u1} & k_{1u2} & \cdots & k_{u1um} \\ k_{u2u1} & k_{u2u2} & \cdots & k_{u2um} \\ \vdots & \vdots & \vdots & \vdots \\ k_{umu1} & k_{umu2} & \cdots & k_{umum} \end{bmatrix}$$

$$k_{uiuj} = \int_{-M}^{M} \frac{1}{2T} \int_{-T}^{T} u_i(t-\tau) u_j(t) \, dt \, d\tau$$

and the real-time measurement $u_i(t)$ (i=1, 2, . . . , m) of the optimized variables calculate the self-correlation integration vector $k_{uu}$ of the optimized variables wherein, T, M are the integral constants greater than 0.

According to the equation:

$$k_{uJ} = \begin{bmatrix} k_{u1J} \\ k_{u2J} \\ \vdots \\ k_{umJ} \end{bmatrix}$$

$$k_{uiJ} = \int_{-M}^{M} \frac{1}{2T} \int_{-T}^{T} u(t-\tau) J(t) \, dt \, d\tau, \, (i=1, 2, \ldots, m)$$

and the real-time measurement J(t) of the objective function are used to calculate the cross-correlation integration vector $k_{uJ}$ of the optimized variable to the objective function, wherein, T and M are the integral constants which are greater than 0.

In above equation: $u_i(t)$, (i=1, 2, . . . , m) and J(t) are the measurement of the optimized variable and the objective function, respectively. Clearly, $k_{uJ}$ and $k_{uu}$ can be calculated by the observed data of the optimized variable and the objective function. Thus, according to the equation $$k_{uJ} = k_{uu} \frac{dEf}{dE\{\tilde{u}(t)\}} + \varepsilon(t),$$

the gradient $$\frac{dEf}{dE\{\tilde{u}(t)\}}$$

of the objective function could be calculated (the gradient $$\frac{dEf}{dE\{\tilde{u}(t)\}}$$

of the objective function may be estimated by Least Squares)

After obtaining the gradient of the objective function, the new set point $u_s(l+1)$ of the optimized variable can be calculated by the directly iterative method.

According to the equation $$u_s(l+1) = u_s(l) + \alpha \frac{dEf}{dE\{\tilde{u}(l)\}},$$

the new set point $u_s(l+1)$ of the optimized variable could be calculated, wherein, α is a constant, if the optimization objective is maximized, α is larger than zero, otherwise, if the optimization objective is minimized, α is smaller than zero.

This iterative process is continuous until the gradient is zero.

In the case of a plurality of objective functions, a similar conclusion also can be obtained.

From above, further detailed procedure of this invention could be described as follows:

1. According to the requirements of the optimized production process, the optimized index, that is, the objective functions $J_1$, $J_2$, . . . , $J_n$, should be determined; these objective functions must be calculable or measurable online. After that, a virtual integrated objective function $J=\sigma_1 J_1 + \sigma_2 J_2 +, \ldots, +\sigma_n J_n$ is constructed, wherein $\alpha_1, \alpha_2, \ldots, \sigma_n$ are the weights of the objective functions respectively, whose value is between 0 to 1 according to the requirement of the process. It must be noticed that the weights may be changed over time because the objective function in the production may be switched or modified some time.

According to the process requirements, the controllable optimized variables should be selected as the optimized variables $u_1, u_2, \ldots, u_m$.

The optimized variables are controlled by traditional controllers, while the set points of these controllers are calculated by a high-level optimization computer with the DCI technique. According to the process requirements, the set points are adjusted periodically.

A Distributed Control System (DCS) or the conventional instruments can be used as the traditional controllers, and their set points are calculated by an optimization computer using the DCI technique, and are adjusted periodically (the period depends on the response speed of the optimized process)

2. Collecting the data of the optimized variables and the objective functions. The method is: based on the specific dynamic characteristics of the process, a real-time data sampling system with moving sampling data window which has some width is established, the width of the window should be three times larger than the transient time from the optimized variable to the objective function, normally 8-18 hours). Usually the system is composed by the DCS to obtain the historical data of the optimized variables and the objective functions of the production process. The system collects the data in every sampling time (the sampling time interval also depends on the process, generally 30-90 seconds). The data in the sampling data window is stored in a database. In each sampling, the sampling data window moves forward by one sampling time interval, that is to say, the oldest data will be discarded, and the latest data will be added to the database. The example of two optimized variables is shown in FIG. 3.

3. After the data has been sampled, the DCI matrix $K_{UU}$ of the optimized variables could be calculated. Assume there are m optimized variables, then $$k_{UU} = \begin{Bmatrix} k_{11} & k_{12} & \cdots & k_{1m} \\ k_{21} & k_{22} & \cdots & k_{2m} \\ \vdots & \vdots & \vdots & \vdots \\ k_{m1} & k_{m2} & \cdots & k_{mm} \end{Bmatrix}$$

Wherein, $$k_{ij} = \int_{-M}^{M} \frac{1}{2T} \int_{-T}^{T} u_i(\lambda) u_j(\lambda - \tau) d\lambda d\tau$$

i, j=1, 2, . . . m T and M are integral constants.

4. The DCI matrix $K_{UJ}$ of the optimized variables and the objective functions is calculated. Assume there are n objective functions:

$$K_{UJ} = \begin{bmatrix} K_{UJ1} \\ K_{UJ2} \\ \vdots \\ K_{UJn} \end{bmatrix}$$

Wherein, $$K_{UJ1} = \begin{bmatrix} k_{u1J1} \\ k_{u2J1} \\ \vdots \\ k_{umJ1} \end{bmatrix} \ldots K_{UJn} = \begin{bmatrix} k_{u1Jn} \\ k_{u2Jn} \\ \vdots \\ k_{umJn} \end{bmatrix}$$

$$k_{uiJs} = \int_{-M}^{M} \frac{1}{2T} \int_{-T}^{T} u_i(\lambda) J_s(\lambda - \tau) d\lambda d\tau$$

(i=1, 2, . . . , m; s=1, 2, . . . , n) T and M are integral constants.

In the DCI theory, M above should be greater than the maximal time constant from the optimized variables to the objective functions, and T is 1-5 times of M.

5. With $K_{UJ}$ and $K_{UU}$, the gradient vector $K_o^d$ of the optimized variables to the objective functions is calculated. In first, the following linear equation is solved to obtain $K^d$:

$$K_{UJ} = K_{UU} K^d$$

$$K_{UU} = \begin{bmatrix} k_{UU} & 0 & \ldots & 0 \\ 0 & k_{UU} & 0 & 0 \\ \vdots & 0 & \ddots & \vdots \\ 0 & \ldots & 0 & k_{UU} \end{bmatrix}$$

And $$K^d = \begin{bmatrix} K_{J1}^d \\ K_{J2}^d \\ \vdots \\ K_{Jn}^d \end{bmatrix}$$

The gradient vector $K_o^d$ of the integrated objective function to the optimized variables is:

$$K_o^d = \sigma_1 K_{J1}^d + \sigma_2 K_{J2}^d, \ldots, K_{Jn}^d$$

6. According to the gradient vector $K_o^d$ of the integrated objective function to the optimized variables, the change direction of the optimized variable is calculated, the principle is: if the gradient is zero, then the current values of the optimized variable are in the optimal state, and if they are not zero, the optimized variables are adjusted according to the value and direction of the gradient. For example, the present values of the optimized variables are known, and the values after the adjustment could be calculated in the following way to drive the objective functions to be maximum.

$$\begin{bmatrix} u_1(l+1) \\ u_2(l+1) \\ \vdots \\ u_m(l+1) \end{bmatrix} = \begin{bmatrix} \alpha_1 k_{1\sigma}^d & 0 & \ldots & 0 \\ 0 & \alpha_2 k_{2\sigma}^d & 0 & \vdots \\ \vdots & 0 & \ddots & 0 \\ 0 & \ldots & 0 & \alpha_m k_{m\sigma}^d \end{bmatrix} \begin{bmatrix} u_1(l) \\ u_2(l) \\ \vdots \\ u_m(l) \end{bmatrix}$$

Wherein, $$\begin{bmatrix} u_1(l) \\ u_2(l) \\ \vdots \\ u_m(l) \end{bmatrix}$$

is the lth step value in the case of m optimized variables, and $$\begin{bmatrix} u_1(l+1) \\ u_2(l+1) \\ \vdots \\ u_m(l+1) \end{bmatrix}$$

is the (l+1) th step value after the adjustment of the optimized variables. Here, $$\begin{bmatrix} k_{1\sigma}^d \\ k_{2\sigma}^d \\ \vdots \\ k_{m\sigma}^d \end{bmatrix} = K_\sigma^d$$

$\alpha_1, \alpha_2, \ldots, \alpha_m$ are m positive constants (if the objective function are maximized). An example is that the RTO with one optimized variable is used to maximize the objective function, and the adjustment procedures are illustrated in FIG. 4, FIG. 5, and FIG. 6. When the gradient calculated by the DCI method is zero, the objective function has been maximized, and in this case it is not necessary to adjust the optimized variable, as shown in FIG. 4. If the gradient is negative, the optimized variable should be reduced to improve the objective function, as illustrated in FIG. 5. While in the case of positive gradient, the optimized variable should be increased to improve the objective function.

Clearly, the length of every adjustment step width is $\alpha_i k_{i\sigma}^d$ for the ith optimized variable $u_i$. As long as $\alpha_i$ is took an appropriate value, that is, $\alpha_i$ is set to positive if the objective function is maximized, otherwise is set to negative, then the step width and direction can be adjusted correctly.

After adjustment, the data is sampled again in a sample interval (30-90 seconds), then return to Step 3.

The procedure of step 3 to 6 is done online in cycle, therefore the optimum of the objective function can be achieved. It is necessary that even the gradient has come to zero, the steps 2 to 5 should be done. Because the mapping function of the optimized variables to the objective functions may change (such as changes in the properties of raw materials, the equipment alteration in the process, etc.), it is necessary to keep observing the gradient constantly whether it is zero or not, and adjustment is made at any time in case of any changes, as shown in FIG. 7. When the relationship of the optimized variables and the objective functions change for some reason (such as the raw material change) which makes the current operating point be not optimum, the DCI algorithm will find out that the gradient is not zero and the optimized variable will be turn to approach the optimum again.

This makes the DCI method can find out whether the production process deviates from the optimum at any time, and then trace the optimum.

Comparing with the traditional methods mentioned above, the DCI technique has following features:

In the invention, the DCI method is utilized to calculate the gradient of the objective function, the calculation is based on the dynamic history data of the optimized variables and the objective function in a period of time, that is, in sampling data window. The DCI method is different from the modelling method, when the process is optimised, it is not required that the production process must be in a still state, but can be in dynamic fluctuation state. It also allows the disturbance exists in the optimized variables and the objective functions, although the statistic properties of those fluctuation and disturbance may be unknown.

It is not necessary to build the static and dynamic models in advance, thus the complicated RTO are simplified in great deal. In tradition method, whatever the mechanism modelling or the statistic modelling, the mathematical relationship between the optimized variables and the objective function must be built in advance, then the relationship model are used to find out the maximum of the process. If the process is very complicated, it is difficult to obtain an accurate model or the cost has to be high. However, the DCI method in this invention only uses the information in the vicinity of the current operation point instead of building a large-scale model, which leaves out the complicated modelling work.

The RTO with the DCI in this invention has a strong adaptive property. That is, when the production process deviates from the optimum because of some reasons, the RTO with the DCI technique could find out the deviation and adjust the optimized variable to the new optimum. The function of tracing the optimum automatically is very useful and important in the real production process since the relationship between the operation conditions (the optimized variables) and the objective functions often shifts along with the aging, the alternation, and the modification of the equipment, etc. However, the traditional modelling RTO has to rebuild and/or modify the model.

The method in the invention is a general RTO technique. If only the production process is continues and the optimized indices are measurable or calculable online, it could be applied in the process easily, which shows that the method is independent of the particular process. Contrarily, in the traditional RTO, the model aiming at the special process must be built; and the model for optimization is peculiar to this process and not general for other processes.

The method in the invention uses the natural fluctuation during the normal operation, and no additional test signal is needed. Therefore, the jamming to the process operation is very little.

This technique has the strong anti-disturbance feature. Even in the cases of severe interfering, i.e., the objective function change caused by other factors, such as the material property, is larger than the useful signal (changes in the objective functions caused by the optimized variables), it will still work normally. No RTO has this strong anti-disturbance property in the prior art.

The core of the DCI RTO of this invention is to calculate the gradients of the optimized variables to the objective function with the DCI algorithm, then adjust the optimized variables according to the gradients. The calculation and adjustment of the gradients of the optimized variables are performed continually online. Thus, whatever the method used to calculate the gradients is, the adjustment principle mentioned above could be used to perform RTO, therefore other possible algorithm, such as the identification of the dynamic model, may be used to estimate the gradients, and the RTO of the process could be performed based on them.

DETAILED DESCRIPTION OF THE INVENTION

Figure 1:
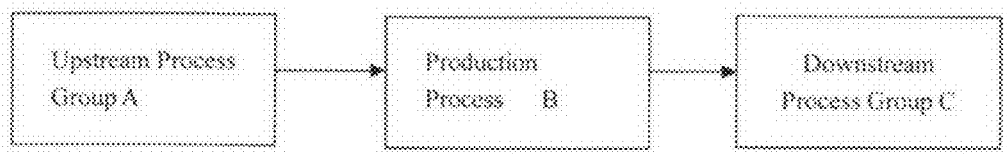
FIG. 1:
A block diagram of continuously feeding and outputting products for the continuous production process.
Figure 2:
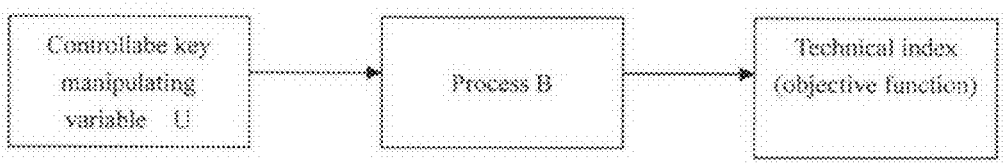
FIG. 2:
A flowchart of the optimization of the operation of the continuous production process.
Figure 3:
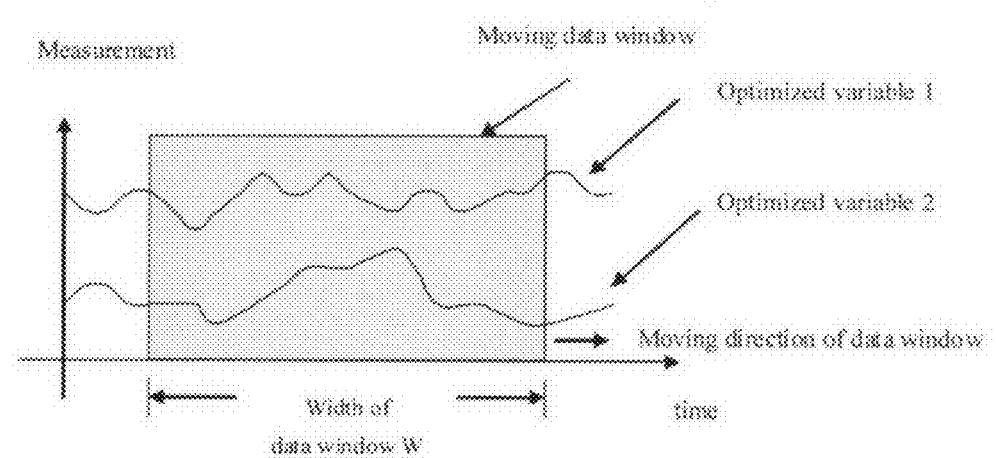
FIG. 3:
A diagram showing the moving sampling data window sampling with two optimized variables.
Figure 4:
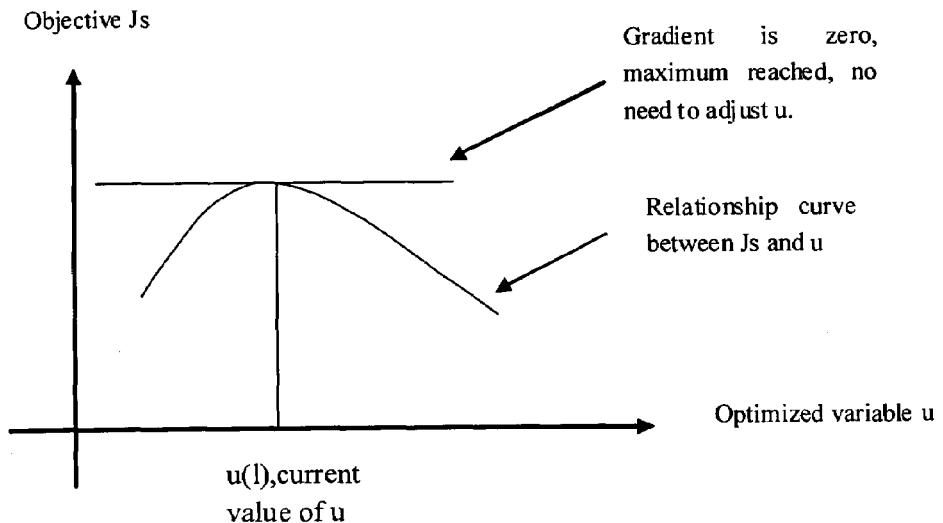
FIG. 4:
A diagram showing the curve of zero gradient of the optimized variables to the objective function.
Figure 5:
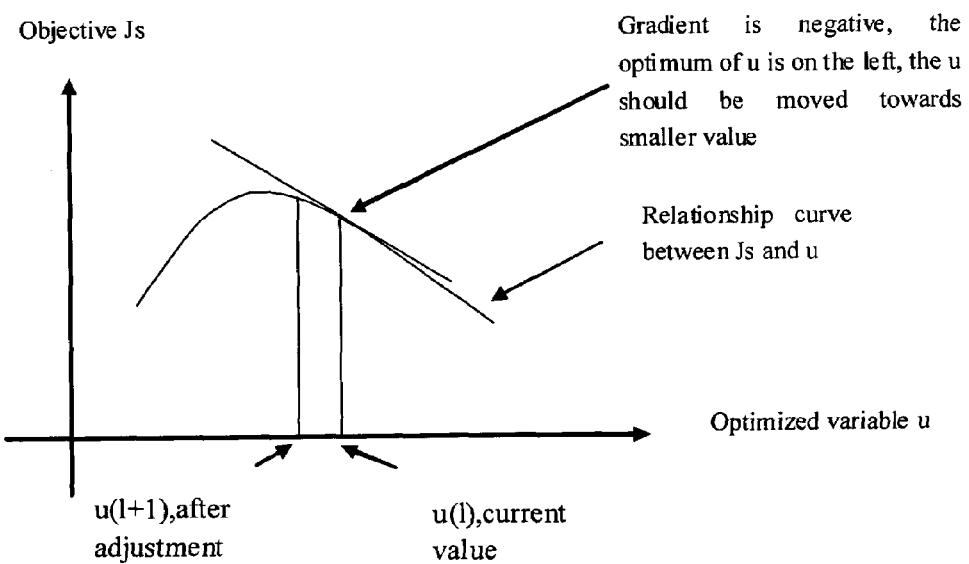
FIG. 5:
A diagram showing the curve of the minus gradient of the optimized variables to the objective function.
Figure 6:
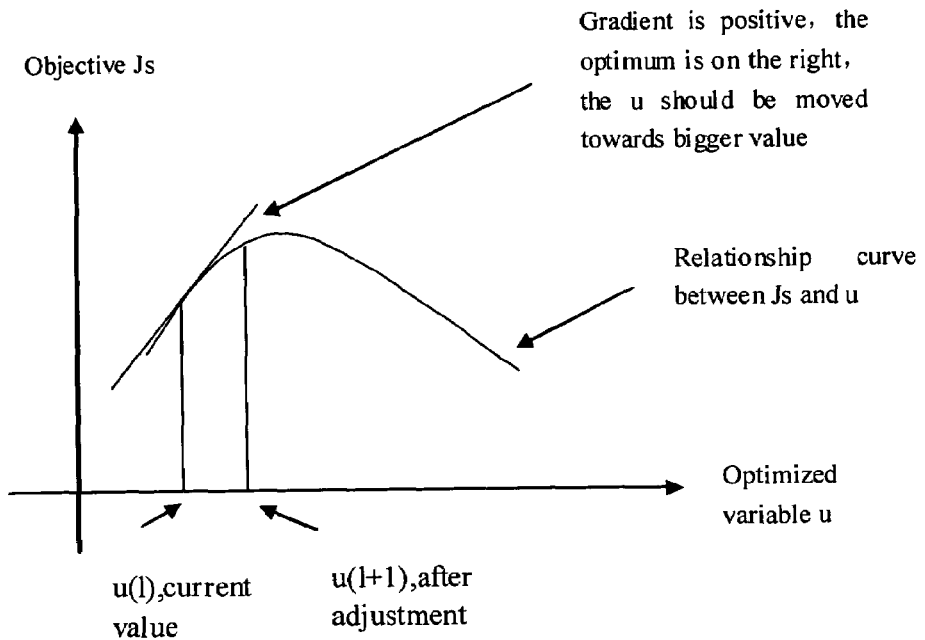
FIG. 6:
A diagram showing the curve of the positive gradient of the optimized variables to the objective function.
Figure 7:
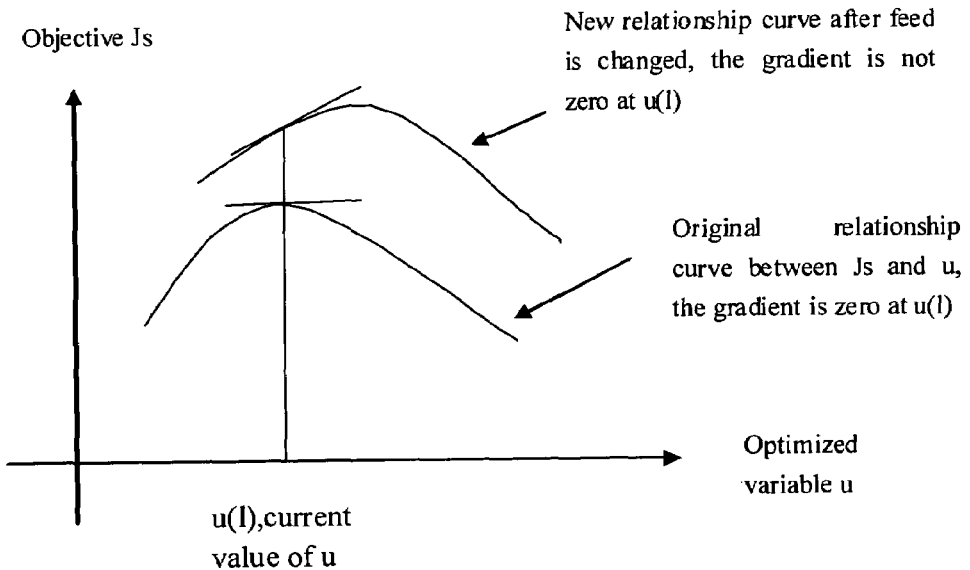
FIG. 7:
A diagram showing the gradient varying with the change of the relationship between the optimized variable and the objective function.
Figure 8:
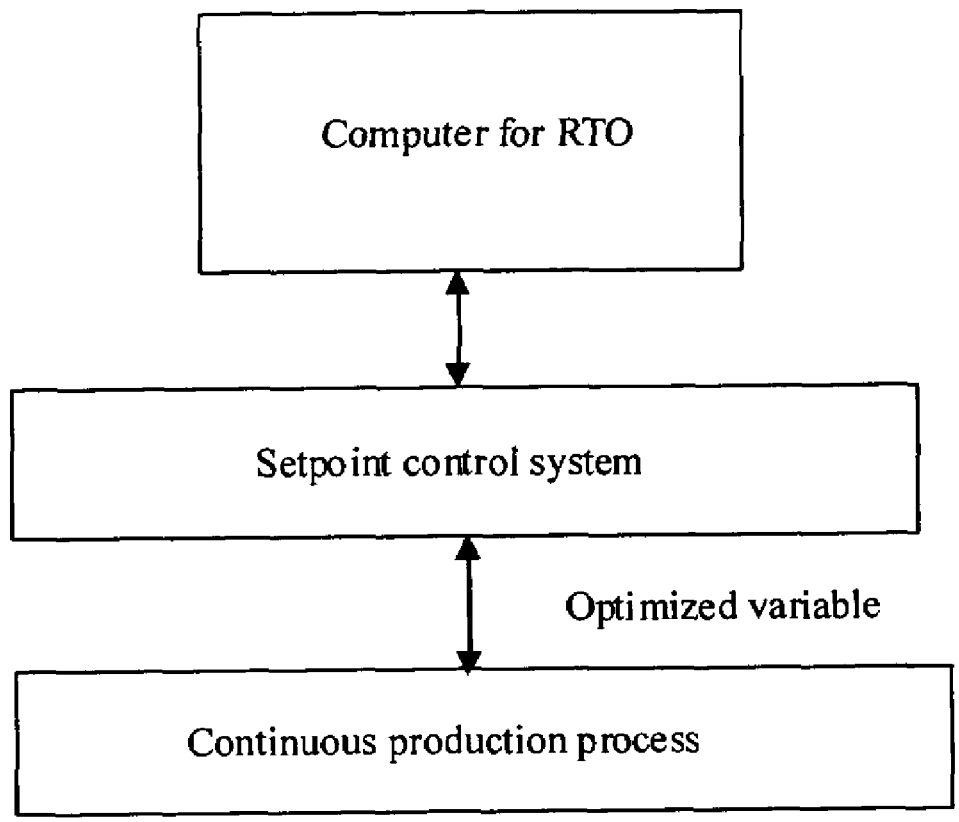
FIG. 8:
A diagram showing the structure of a computer control system used to optimize the process.

Following embodiments are just used to describe, but not limit, the invention, which requires that the production process is controlled by a computer. A DCS or other conventional instrumentation is used to carry out setpoint control for the optimized variables, and the setpoints are calculated by an optimization control computer using the method of this invention, thus the optimized variables are adjusted in a fixed time interval. The adjustment cycle is determined by the dynamic response speed of the actual process, as shown in FIG. 8.

Embodiment 1

Figure 9:
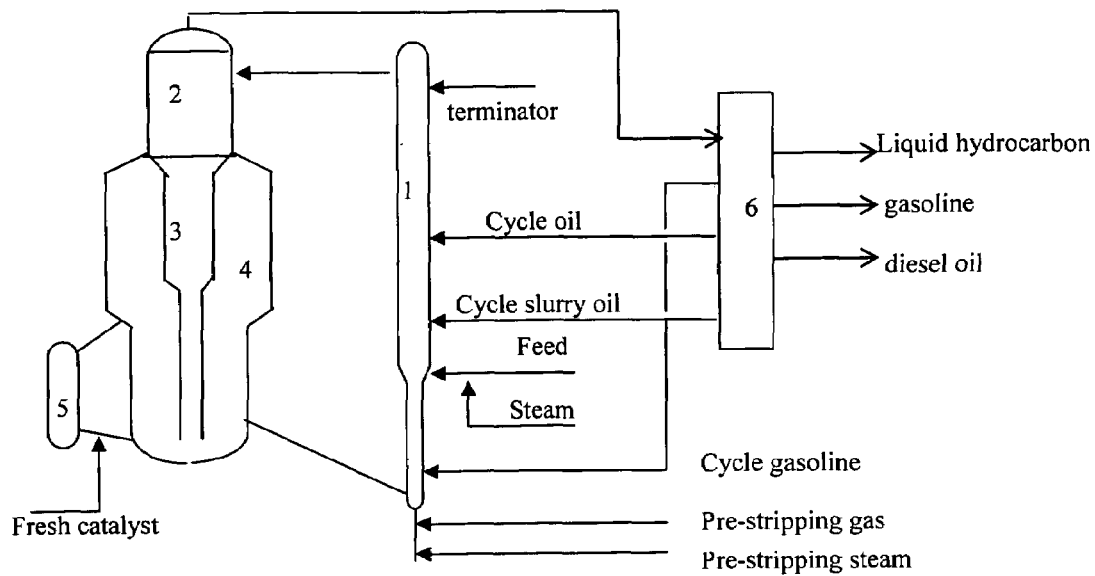
FIG. 9:
A flowchart of the reactor-regeneration of an ARGG Unit.
In the Fig.: 1. riser reactor, 2. cyclone separator, 3. settler, 4. catalyst regenerator, 5 outsourcing thermometers, 6. fractionation system

Real Time Optimization of an ARGG Unit with the Dynamic Correlation Integration Technique The ARGG (Atmospheric Residue Gas and Gasoline) unit in the petrochemical plants is a device to perform a process to crack the low-value oil into the high-value liquid hydrocarbon, gasoline and diesel, which is a representative continuous process in refinery. The flow chart of reactor regeneration system of the ARGG is shown in FIG. 9.

Vacuum residue and wax oil from the tank farm are mixed with the cycle oil and the slurry oil, after heat exchanging with mass flow of a fractionation system 6, the mixed oil is sprayed into the riser reactor 1 through an atomization device at the lower part of the riser reactor 1.

The atomized raw oil, the sprayed steam and the high-temperature catalyst from the regenerator 4 are mixed at the lower part of the reactor 1, and then it mounts up along with the riser reactor 1 to joining the catalytic cracking reaction. Reacted oil and gas with the catalyst are sent to the settler 3 from the top of the riser reactor 1. The oil and gas with the catalyst enter into the cyclone separator 2 to be separated out the catalyst. Finally, the oil and gas leave the separator 2, and enter into the fractionation system 6 for product separation, and the catalyst returns to the regenerator 4.

The separated catalyst enters the regenerator 4. A layer of carbon produced in cracking reaction has been deposited on the surface of the catalyst. The carbon deposition should be burnt out in the regenerator 4, this procedure is called coke-burning. Excess heat in coke-burning is taken away by out-sourcing thermometers 5. The regenerated catalyst after coke-burning is transported to the riser reactor 1 to crack the feed. For keeping the activity of the catalyst and compensating the lost catalyst, a flow of fresh catalyst is added into the regenerator 4.

The oil and gas from the separator 2 enter into the fractionation system 6. After separation process of the system, the liquid hydrocarbon is produced. The recycled oil and the slurry oil from the system and the little part of gasoline are returned to the riser reactor 1.

In the case of the ARGG, the following operating conditions are taken as online optimized variables:
  Outlet temperature of the riser pipe
  Flow of the pre-stripping gas
  Feed temperature
  Flow of the terminator
  Ratio of the cycle gasoline oil
  Ratio of the cycle oil
  Ratio of the oil slurry
  Flow of the fresh catalyst
  Five objective functions are:
  Yield of the liquid hydrocarbon
  Yield of the gasoline
  Yield of the diesel
  Liquid yield (liquid hydrocarbon yield+gasoline yield+ diesel yield)
  Economic benefit of the ARGG unit The control structure of the real time optimization system is illustrated in FIG. 8.

In this system, the setpoint control is carried out by HONEYWELL TPS3000 systems; and the optimizing control is performed by APP (Application Process Processor) of HONEYWELL TPS3000. According to the current request of the process, one objective function from above five objective functions is selected as the technical index to be optimized, and then is performed in the following steps.

1. Naming the optimized variables
  $u_1$=outlet temperature of the riser pipe
  $u_2$=flow of the pre-stripping gas
  $u_3$=feed temperature
  $u_4$=flow of the terminator
  $u_5$=ratio of the cycle gasoline
  $u_6$=ratio of the cycle oil
  $u_7$=ratio of the slurry oil
  $u_8$=flow of the fresh catalyst Naming the Objective Functions
  J1=Yield of the liquid hydrocarbon
  J2=Yield of the gasoline
  J3=Yield of the diesel oil
  J4=Yield of the liquid
  J5=Economic benefit of the unit 2. Establish a data sampling system and a real-time database by using HONEYWELL TPS3000 and OPC in APP computer. The width of the sampling data window is 8 hours, and sampling interval of the optimized variables and the objective (the objective functions) is 60 seconds. The data in the sampling data window is stored in the database. In each sampling, the sampling data window will move forward one sampling interval, that is, the oldest data will be discarded, and the latest data will be added to the database.

3. When data sampling has been completed, the DCI matrix $k_{UU}$ of the optimized variables is calculated, now there are 8 optimized variables:

$$k_{UU} = \begin{pmatrix} k_{11} & k_{12} & \ldots & k_{18} \\ k_{21} & k_{22} & \ldots & k_{28} \\ \vdots & \vdots & \vdots & \vdots \\ k_{81} & k_{82} & \ldots & k_{88} \end{pmatrix}$$

Wherein:

$$k_{ij} = \int_{-3600}^{3600} \frac{1}{2T} \int_{-10800}^{10800} u_i(\lambda) u_j(\lambda - \tau) d\lambda d\tau$$

The high and low limits in the integration are 3600, −3600, 10800, −10800, which are determined by the response time spent from the optimized variables to the objective functions in the process.

4. Calculate the cross-correlation integral matrix $K_{UJ}$ of the operating variables to the objective functions, and there are five objective functions:

$$K_{UJ} = \begin{bmatrix} K_{UJ1} \\ K_{UJ2} \\ \vdots \\ K_{UJ5} \end{bmatrix}$$

Wherein, $$K_{UJ1} = \begin{bmatrix} k_{u1J1} \\ k_{u2J1} \\ \vdots \\ k_{u8J1} \end{bmatrix} \ldots K_{UJ5} = \begin{bmatrix} k_{u1J5} \\ k_{u2J5} \\ \vdots \\ k_{u8J5} \end{bmatrix}$$

$$k_{uiJs} = \int_{-3600}^{3600} \frac{1}{2T} \int_{-10800}^{10800} u_i(\lambda) J_s(\lambda - \tau) d\lambda d\tau$$

$$(i = 1, 2, \ldots, 8; s = 1, 2, \ldots, 5)$$

5. According to $K_{UJ}$ and $k_{UU}$, the gradient vector $K_\sigma^d$ of the optimized variables to the integrated objective function is calculated. Firstly, solving the following linear equation to obtain $K^d$:

$$K_{UJ} = K_{UU} K^d$$

$$K_{UU} = \begin{bmatrix} k_{UU} & 0 & \ldots & 0 \\ 0 & k_{UU} & 0 & 0 \\ \vdots & 0 & \ddots & \vdots \\ 0 & \ldots & 0 & k_{UU} \end{bmatrix}$$

And $$K^d = \begin{bmatrix} K_{J1}^d \\ K_{J2}^d \\ \vdots \\ K_{Jn}^d \end{bmatrix}$$

The gradient vector $K_\sigma^d$ of the integrated objective function to the optimized variables is:

$$K_\sigma^d = \sigma_1 K_{J1}^d + \sigma_2 K_{J2}^d, \ldots, \sigma_5 K_{J5}^d$$

Wherein, in accordance with the current optimization objective functions, $\sigma_1, \sigma_2, \ldots, \sigma_5$ are five constants, which may be 0 or 1. For example, the current optimal objective is the yield of the liquid hydrocarbon, and $\sigma_1$ is 1 and the rest are 0, other cases are deduced by analogy.

6. According to the gradient vector $K_\sigma^d$ of the integrated objective function to the optimized variables, the change direction of the optimized variables is calculated, the regulation rule is: if the gradient is zero, the current optimized variable is in optimal state, and if it is not zero, the optimized variable needs to be adjusted according to the size and direction of the gradient. For example, the current values of the optimized variables $(u_1(l) \ldots u_8(l))$ are known, the values of the optimized variables in the next step could be calculated in the following way to drive the objective functions to maximum.

$$\begin{bmatrix} u_1(l+1) \\ u_2(l+1) \\ \vdots \\ u_8(l+1) \end{bmatrix} = \begin{bmatrix} \alpha_1 k_{1\sigma}^d & 0 & \ldots & 0 \\ 0 & \alpha_2 k_{2\sigma}^d & 0 & \vdots \\ \vdots & 0 & \ddots & 0 \\ 0 & \ldots & 0 & \alpha_8 k_{8\sigma}^d \end{bmatrix} \begin{bmatrix} u_1(l) \\ u_2(l) \\ \vdots \\ u_8(l) \end{bmatrix}$$

Wherein, $$\begin{bmatrix} u_1(l) \\ u_2(l) \\ \vdots \\ u_8(l) \end{bmatrix}$$

is the original value of the eight optimized variables, while $$\begin{bmatrix} u_1(l+1) \\ u_2(l+1) \\ \vdots \\ u_8(l+1) \end{bmatrix}$$

is the next value of the optimized variables.

$$\begin{bmatrix} k_{1\sigma}^d \\ k_{2\sigma}^d \\ \vdots \\ k_{8\sigma}^d \end{bmatrix} = K_\sigma^d$$

$\alpha_1, \alpha_2, \ldots, \alpha_8$ are eight positive constants, the values of which are related to the convergence rate of the optimal control, and need to be adjusted on site. In this case, they are all adjusted to 0.001.

7. Back to step 3.

From the comparison test in this case, the data of the liquid hydrocarbon yield, the liquid yield, and the economic benefits are shown in the following table:

| Contrast of the objective functions before and after optimization | | | |
| --- | --- | --- | --- |
| Objective function | Default value | Optimized value | Increment |
| Yield of liquid hydrocarbon (%) | 27.05 | 27.83 | +0.77 |
| Yield of total liquids (%) | 85.01 | 85.97 | +0.96 |
| Economic benefit (Yuan/Ton feed) | 153.20 | 194.46 | +41.26 |

From the above test results, it could be seen that the system has a better effect.

Embodiment 2

Real Time Optimization of the Solvent Dewaxing-Deoil Process with the Dynamic Correlation Integration Technique The dewaxing-deoil is an important procedure of the lubricating-oil production in the refinery. A dewaxing-deoil unit, which is used to separate the lubricating oil and the paraffin from the raw materials of oil, performs a continuous process. The process is illustrated in FIG. 10.

Figure 10:
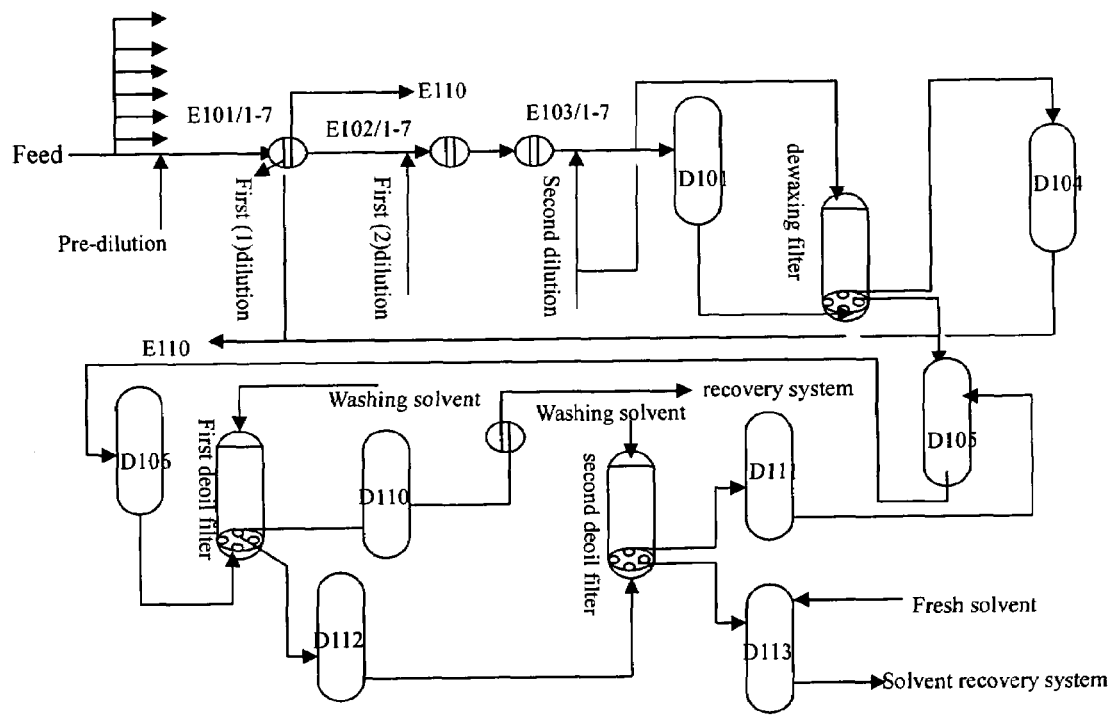
FIG. 10:
A flowchart of a joined unit of benzene dewaxing and deoil process.

It could be seen from FIG. 10 that the raw oil is distributed into 7 branches. There are 3 crystallizers in each branch. Before entering crystallizers, the feed is firstly diluted with the filtrate in each branch, and this operation is called pre-dilution. Then the feed enters the heat exchanger E101, at the same time the fresh solvent and the cooling filtrate are added, that operation is called a first (1) dilution. When flowing out of E101, the filtrate is added into the feed again, which is called a first (2) dilution. After that, the feed enters the ammonia cooled crystallizers E102 and E103, and then the fresh solvent is injected, which is called a second dilution. The crystallized feed then is transported to the buffer tank D101 and entered into the dewaxing filters at last. During filtering, a washing solvent is sprayed into the filters. The filtrate from the filters passes through the filtrate buffer tank D104 and flow into the solvent recovery system. The wax from the filters is transported to the wax tank D105 and D106, and then is send to the first deoil filter. A washing solvent is sprayed in the filter, and the filtrate from the first deoil filter is sent to the tanker D110. The wax from the first deoil filter passes through the wax tanker D112, in which a fresh solvent is mixed, then enters the second deoil filter and a washing solvent is sprayed in it. The filtrate from the second deoil filter passes through the tanker D111 and comes into the wax tanker D105. The wax from the second deoil filter is mixed with the fresh solvent in D113 and then flows to the solvent recovery system.

In the example of this process, the objective function is the yield of the deoiled wax. The following 23 variables are taken as the online optimized variables, there are all the ratios of the solvent to feed flow:

ratio_of_flow1_pre_dirution
ratio_of_flow2_pre_dirution
ratio_of_flow3_pre_dirution
ratio_of_flow4_pre_dirution
ratio_of_flow5_pre_dirution
ratio_of_flow6_pre_dirution
ratio_of_flow7_pre_dirution
ratio_of_solvent1__1_to_flow1
ratio_of_solvent1__1_to_flow2
ratio_of_solvent1__1_to_flow3
ratio_of_solvent1__1_to_flow4
ratio_of_solvent1__1_to_flow5
ratio_of_solvent1__1_to_flow6
ratio_of_solvent1__1_to_flow7
ratio_of_solvent1__2_to_flow1
ratio_of_solvent1__2_to_flow2
ratio_of_solvent1__2_to_flow3
ratio_of_solvent1__2_to_flow4
ratio_of_solvent1__2_to_flow5
ratio_of_solvent1__2_to_flow6
ratio_of_solvent1__2_to_flow7
ratio_of_solvent2_to_feed
ratio_of_spray_solvent_to_feed Note: solvent1__1 refers to first(1) dilution, solvent1__2 refers to first(2) dilution, and solvent2 refers to second dilution, rest can be deduced by analogy In this system, the setpoint control is performed by YOKOGAWA Centum CS systems; the optimizing control algorithm is carried out by an operating station. The sampling data window of the DCI optimizer has a width of 13 hours, and the data of 23 optimized variables and the objective function (yield of deoiled wax) are collected every 60 seconds. the control calculation is performed in the following steps.

1. Naming the key operating variables
$u_1$=ratio_of_flow1_pre_dirution
$u_2$=ratio_of_flow2_pre_dirution
$u_3$=ratio_of_flow3_pre_dirution
$u_4$=ratio_of_flow4_pre_dirution
$u_5$=ratio_of_flow5_pre_dirution
$u_6$=ratio_of_flow6_pre_dirution
$u_7$=ratio_of_flow7_pre_dirution
$u_8$=ratio_of_solvent1__1_to_flow1
$u_9$=ratio_of_solvent1__1_to_flow2
$u_{10}$=ratio_of_solvent1__1_to_flow3
$u_{11}$=ratio_of_solvent1__1_to_flow4
$u_{12}$=ratio_of_solvent1__1_to_flow5
$u_{13}$=ratio_of_solvent1__1_to_flow6
$u_{14}$=ratio_of_solvent1__1_to_flow7
$u_{15}$=ratio_of_solvent1__2_to_flow1
$u_{16}$=ratio_of_solvent1__2_to_flow2
$u_{17}$=ratio_of_solvent1__2_to_flow3
$u_{18}$=ratio_of_solvent1__2_to_flow4
$u_{19}$=ratio_of_solvent1__2_to_flow5
$u_{20}$=ratio_of_solvent1__2_to_flow6
$u_{21}$=ratio_of_solvent1__2_to_flow7
$u_{22}$=ratio_of_solvent2_to_feed
$u_{23}$=ratio of spray solvent to feed Naming the Objective Functions
J1=Yield of the deoiled wax 2. A data sampling system is established by using the YOKOGAWA Centum CS and a real-time database with a sampling data window of a width of 13 hours. The database collects the data of the optimized variables and the objective functions every 60 seconds. The data in the sampling data window is stored in the database. Each one-mining sampling data window will be moved forward to one sampling time interval, that is to say, the oldest data will be discarded, and the latest data will be added to the database.

3. When the data sampling has been completed, the DCI matrix $K_{UU}$ of optimized variables is calculated, now there are 23 optimized variables:

$$k_{UU} = \begin{Bmatrix} k_{11} & k_{12} & \cdots & k_{1m} \\ k_{21} & k_{22} & \cdots & k_{2m} \\ \vdots & \vdots & \vdots & \vdots \\ k_{m1} & k_{m2} & \cdots & k_{mm} \end{Bmatrix}$$

wherein, $$k_{ij} = \int_{-M}^{M} \frac{1}{2T} \int_{-T}^{T} u_i(\lambda) u_j(\lambda - \tau) d\lambda d\tau$$

i, j=1, 2, ... m, m=23, T=7200, M=14000 are the integral constants, which are determined by the response time spent from the optimized variables to the objective function in the process.

4. The DCI matrix $K_{UJ}$ of the optimized variables to the objective function are calculated:

$$K_{UJ} = K_{UJ1}$$

Wherein, $$K_{UJ1} = \begin{bmatrix} k_{u1J1} \\ k_{u2J1} \\ \vdots \\ k_{umJ1} \end{bmatrix}$$

$$k_{uiJ1} = \int_{-M}^{M} \frac{1}{2T} \int_{-T}^{T} u_i(\lambda) J_1(\lambda - \tau) d\lambda d\tau$$

$(i = 1, 2, \ldots, m)$

T and M are the integral constants, m=23, T=7200, M=14000.

5. According to $K_{UJ}$ and $K_{UU}$, the gradient vector $K_\sigma{}^d$ of the optimized variables to the objective function is calculated, firstly, the following linear equation could be solved to obtain $K^d$:

$$K_{UJ} = K_{UU} K^d$$

$$K_{UU} = \begin{bmatrix} k_{UU} & 0 & \cdots & 0 \\ 0 & k_{UU} & 0 & 0 \\ \vdots & & 0 & \ddots & \vdots \\ 0 & \cdots & & 0 & k_{UU} \end{bmatrix}$$

and $K_\sigma{}^d = \sigma_1 K_{UJ1}{}^d$

The gradient vector $K_\sigma{}^d$ of the integrated objective function to the optimized variables is:

$$K_\sigma{}^d <= \sigma_1 K_{J1}{}^d$$

Wherein, $\sigma_1 = 1$

6. According to the gradient vector $K_\sigma{}^d$, of the objective function to the optimized variables, the change direction of the optimized variables is calculated, and the principle is: if the gradient is zero, then the current optimized variables are in the optimal state, and if it is not zero, the optimized variables are adjusted according to the size and the direction of the gradient. For example, the current value of the optimized variables is known, the adjusted value of the optimized variables is calculated in following way to make the objective functions be maximum:

$$\begin{bmatrix} u_1(l+1) \\ u_2(l+1) \\ \vdots \\ u_m(l+1) \end{bmatrix} = \begin{bmatrix} \alpha_1 k_{1\sigma}^d & 0 & \cdots & 0 \\ 0 & \alpha_2 k_{2\sigma}^d & 0 & \vdots \\ \vdots & 0 & \ddots & 0 \\ 0 & \cdots & 0 & \alpha_m k_{m\sigma}^d \end{bmatrix} \begin{bmatrix} u_1(l) \\ u_2(l) \\ \vdots \\ u_m(l) \end{bmatrix}$$

Wherein, $$\begin{bmatrix} u_1(l) \\ u_2(l) \\ \vdots \\ u_m(l) \end{bmatrix}$$

is the original value of the optimized variables, and $$\begin{bmatrix} u_1(l+1) \\ u_2(l+1) \\ \vdots \\ u_m(l+1) \end{bmatrix}$$

is the new value of the optimized variables.

$$\begin{bmatrix} k_{1\sigma}^d \\ k_{2\sigma}^d \\ \vdots \\ k_{m\sigma}^d \end{bmatrix} = K_\sigma^d$$

$\alpha_1, \alpha_2, \ldots, \alpha_m$ m=23, are m positive constants, they relate to the convergence rate of the optimal control, and need to be adjusted on site. In this case, they are all adjusted to 0.001.

7. Back to step 3.

The result of the comparison test is shown in the table below:

| Comparison test data | | | |
|---|---|---|---|
| | Oil yield (%) | Wax yield (%) | WasteWax-Oil yield (%) |
| Default yield | 50.13 | 42.64 | 7.67 |
| Optimal yield | 49.57 | 43.85 | 6.9 |
| Increment | −0.56 | +1.21 | −0.77 |

From the above results, it could be seen that the wax yield is raised 1.21% after optimization.

The invention claimed is:

1. A real-time operating optimization method of a multi-input and multi-output continuous production process, it is characterized in that: the key manipulating variables in the production process are taken as the optimized variables, and the technical targets associated with these manipulating variables are supposed as the objective functions, then the gradient vector of the objective functions and the optimized variables are calculated currently online based on the historical data of the objective functions and the optimized variables, after that the gradient vector is used to decide the adjustment direction of the optimized variables, if the gradient vector is positive or negative, the optimized variables are adjusted to the zero gradient direction for optimizing the objective functions, the gradient vector is calculated online continuously, regardless of whether the objective functions are optimum or not, if the gradient is not zero, the respective optimized variables are adjusted to the direction of zero gradient, and the dynamic correlation integration (DCI) technique is used to calculate the current gradient vector of the optimized variables to the objective functions based on historical data.

2. The real-time operating optimization method of claim 1, it is characterized in that the dynamic correlation integration technique includes the following steps:

the objective function $\tilde{J}(t)$, which should be measurable or calculable online, is determined, and can be expressed as:

$$\tilde{J}(t) = f(\tilde{u}(t), \tilde{p}(t), t)$$

wherein $\tilde{u}(t)$ is m-space mean controllable optimized variables, $\tilde{p}(t)$ is disturbance, and f is unknown mapping, according to the equation:

$$k_{uu} = \begin{bmatrix} k_{u1u1} & k_{1u2} & \cdots & k_{u1um} \\ k_{u2u1} & k_{u2u2} & \cdots & k_{u2um} \\ \vdots & \vdots & \vdots & \vdots \\ k_{umu1} & k_{umu2} & \cdots & k_{umum} \end{bmatrix}$$

$$k_{uiuj} = \int_{-M}^{M} \frac{1}{2T} \int_{-T}^{T} u_i(t-\tau) u_j(j) \, dt \, d\tau$$

and the real-time measurement $u_i(t)$ (i=1, 2, ..., m) of the optimized variables to calculate the self-correlation integral matrix $k_{uu}$ of the optimized variables, wherein, T, M are integral constants greater than zero,
according to the equation:

$$k_{uJ} = \begin{bmatrix} k_{u1J} \\ k_{u2J} \\ \vdots \\ k_{umJ} \end{bmatrix}$$

$$k_{uiJ} = \int_{-M}^{M} \frac{1}{2T} \int_{-T}^{T} u(t-\tau) J(t) \, dt \, d\tau, \quad (i=1, 2, \ldots, m)$$

and the real-time measurement J(t) of the objective function, the cross-correlation integral vector $k_{uJ}$ of the optimized variables to the objective function is calculate, wherein, T, M are integral constants which are greater than zero,
the gradient $$\frac{dEf}{dE\{\tilde{u}(t)\}}$$

of the objective function is calculated by solving the equation $$k_{uJ} = k_{uu} \frac{dEf}{dE\{\tilde{u}(t)\}} + \varepsilon(t)$$

according to the equation $$u_s(l+1) = u_s(l) + \alpha \frac{dEf}{dE\{\tilde{u}(t)\}},$$

a new setpoint $u_s(l+1)$ of the optimized variable is calculated, wherein, $\alpha$ is a constant.

3. The real-time operating optimization method of claim 2, it is characterized in that further comprising the following steps:
(1) according to requirements of the optimized process, a number of objective functions $J_1, J_2, \ldots, J_n$, which must be calculable or measurable online, are determined, then a virtual integrated objective function $J = \sigma_1 J_1 + \sigma_2 J_2 +, \ldots, +\sigma_n J_n$ is constructed, here $\sigma_1, \sigma_2, \ldots, \sigma_n$ are weights of the respective objective functions, their values are between 0 and 1, depending on the process requirement, the weights may be changed over time because the objective function in the production may be switched,
based on the analysis of the production process, the key manipulating variables $u_1, u_2, \ldots, u_m$ are selected as the optimized variables,
the optimized variables are controlled by a traditional setpoint control system, the setpoints of the control system are calculated by an optimization control computer by using the DCI technique, according to the process requirements, the setpoints are adjusted in a certain period of time,
(2) a real-time data sampling system with a sampling data window is established to collect the data of the optimized variables and the objective functions from the production process, thus their historical data group is obtained,
(3) after data sampling, the DCI matrix $k_{uu}$ of the optimized variables is calculated, assume there are m optimized variables, then:

$$k_{UU} = \begin{Bmatrix} k_{11} & k_{12} & \cdots & k_{1m} \\ k_{21} & k_{22} & \cdots & k_{2m} \\ \vdots & \vdots & \vdots & \vdots \\ k_{m1} & k_{m2} & \cdots & k_{mm} \end{Bmatrix}$$

wherein, $$k_{ij} = \int_{-M}^{M} \frac{1}{2T} \int_{-T}^{T} u_i(\lambda) u_j(\lambda - \tau) \, d\lambda \, d\tau$$

i, j=1, 2, ... m, T and M are integral constants,
(4) The DCI matrix $K_{UJ}$ of the optimized variable to the objective functions is calculated, assume there are n objective functions:

$$K_{UJ} = \begin{bmatrix} K_{UJ1} \\ K_{UJ2} \\ \vdots \\ K_{UJn} \end{bmatrix}$$

wherein, $$K_{UJ1} = \begin{bmatrix} k_{u1J1} \\ k_{u2J1} \\ \vdots \\ k_{umJ1} \end{bmatrix} \ldots$$

$$K_{UJn} = \begin{bmatrix} k_{u1Jn} \\ k_{u2Jn} \\ \vdots \\ k_{umJn} \end{bmatrix}$$

$$k_{uiJs} = \int_{-M}^{M} \frac{1}{2T} \int_{-T}^{T} u_i(\lambda) J_s(\lambda - \tau) \, d\lambda \, d\tau$$

(i=1, 2, ..., m; s=1, 2, ..., n) T and M are integral constants, (5) based on $K_{UJ}$ and $k_{UU}$, the gradient vector $K_o^d$ of the optimized variables to the integrated objective functions is calculated, firstly, the following linear equation is solved to get $K^d$:

$$K_{UJ} = K_{UU} K^d$$

$$K_{UU} = \begin{bmatrix} k_{UU} & 0 & \cdots & 0 \\ 0 & k_{UU} & 0 & 0 \\ \vdots & 0 & \ddots & \vdots \\ 0 & \cdots & 0 & k_{UU} \end{bmatrix}$$

and $$K^d = \begin{bmatrix} K_{J1}^d \\ K_{J2}^d \\ \vdots \\ K_{Jn}^d \end{bmatrix}$$

the gradient vector $K_o^d$ of the integrated objective function to the optimized variables is:

$$K_o^d = \sigma_1 K_{J1}^d + \sigma_2 K_{J2}^d, \ldots, K_{Jn}^d$$

(6) according to the gradient vector $K_o^d$, the change direction of the optimized variables is calculated, the calculation rule is: if the gradient is zero, then the current optimized variables are in the optimal state, and if it is not zero, the optimized variables need to be adjusted according to the size and direction of the gradient, (7) after adjustment, the data is re-sampled in a certain time interval, and then return to Step (3), wherein the procedure of step (3)-(6) is performed online periodically to achieve the optimum of the objective functions.

4. The real-time operating optimization method of claim 3, it is characterized in that: in step (1), the setpoint control of the optimized variables is performed by a DCS or other traditional instruments, and the setpoints are calculated by optimization control computer by using the DCI technique, and the setpoints are adjusted in a certain period of time.

5. The real-time operating optimization method of claim 3, it is characterized in that: in step (2), a real-time data sampling system with a certain width sampling data window is established, the width of the window depends on the specific time response of the process, the sampling system collects the data of the optimized variables and the objective functions in a certain period of time, and the sampling system is composed by the DCS to collect the historical data of the optimized variables and the objective functions in the production process, the data in the sampling data window is stored in the database, in each sampling, the sampling data window will be moved forward to one sampling interval, that is, the oldest data will be discarded, and the latest data will be added to the database.

6. The real-time operating optimization method of claim 5, it is characterized in that: in step (2), the width of the sampling data window is three times larger than the transition time from the optimized variables to the objective function.

7. The real-time operating optimization method of claim 6, it is characterized in that: in step (6), every adjustment step width is $\alpha_i k_{i\sigma}^d$, with respect to the ith optimized variable $u_i$, $\alpha_i$ should be appropriate values, in the case of maximizing the objective function, $\alpha_i$ should be positive, otherwise, $\alpha_i$, should be negative.

8. The real-time operating optimization method of claim 5, it is characterized in that: in step (2), the sampling interval in collecting the data of the optimized variables and the objective functions depends on the dynamic transient speed of the process, and is 30-90 seconds.

9. The real-time operating optimization method of claim 3, it is characterized in that: in step (6), if the gradient is zero, then the current optimized variables are in the optimal states, and if it is not zero, the optimized variables need to be adjusted according to the size and direction of the gradient, when the maximal integrated objective function is assumed, the adjusted value of the optimized variable is calculated by the following algorithm based on the known current values of the optimized variables:

$$\begin{bmatrix} u_1(l+1) \\ u_2(l+1) \\ \vdots \\ u_m(l+1) \end{bmatrix} = \begin{bmatrix} \alpha_1 k_{1\sigma}^d & 0 & \cdots & 0 \\ 0 & \alpha_2 k_{2\sigma}^d & 0 & \vdots \\ \vdots & & 0 & \ddots & 0 \\ 0 & \cdots & 0 & \alpha_m k_{m\sigma}^d \end{bmatrix} \begin{bmatrix} u_1(l) \\ u_2(l) \\ \vdots \\ u_m(l) \end{bmatrix}$$

wherein, $$\begin{bmatrix} u_1(l) \\ u_2(l) \\ \vdots \\ u_m(l) \end{bmatrix}$$

is the original value of the m optimized variables, and $$\begin{bmatrix} u_1(l+1) \\ u_2(l+1) \\ \vdots \\ u_m(l+1) \end{bmatrix}$$

is the value of the optimized variables after adjustment, $$\begin{bmatrix} k_{1\sigma}^d \\ k_{2\sigma}^d \\ \vdots \\ k_{m\sigma}^d \end{bmatrix} = K_\sigma^d$$

$\alpha_1, \alpha_2, \ldots, \alpha_m$ are m positive constants if the optimized objective is to be maximized.

* * * * *